(12) United States Patent
Yamada et al.

(10) Patent No.: US 7,239,811 B2
(45) Date of Patent: Jul. 3, 2007

(54) OPTICAL-AXIS DIRECTIONAL INDICATING APPARATUS FOR OPTICAL COMMUNICATION

(75) Inventors: Kiriko Yamada, Yokohama (JP);
Takayoshi Sasao, Yokohama (JP);
Junichi Kubota, Yokohama (JP)

(73) Assignee: Victor Company of Japan, Ltd. (JP)

( * ) Notice: Subject to any disclaimer, the term of this patent is extended or adjusted under 35 U.S.C. 154(b) by 557 days.

(21) Appl. No.: 10/776,660

(22) Filed: Feb. 9, 2004

(65) Prior Publication Data

US 2004/0184822 A1    Sep. 23, 2004

(30) Foreign Application Priority Data

Feb. 18, 2003    (JP)    ............................. 2003-039873

(51) Int. Cl.
*H04B 10/00*    (2006.01)
(52) U.S. Cl. ........................ 398/130; 398/131; 398/129
(58) Field of Classification Search ................ 398/129, 398/131, 130
See application file for complete search history.

(56) References Cited

U.S. PATENT DOCUMENTS

| | | | | |
|---|---|---|---|---|
| 4,824,367 A | * | 4/1989 | Rosenstiel et al. | ............ 433/75 |
| 5,532,858 A | * | 7/1996 | Hirohashi et al. | ............ 398/57 |
| 5,584,838 A | * | 12/1996 | Rona et al. | .................. 606/96 |
| 5,963,194 A | * | 10/1999 | Umeda et al. | .............. 345/157 |
| 6,504,634 B1 | * | 1/2003 | Chan et al. | ................. 398/129 |
| 6,509,992 B1 | | 1/2003 | Goodwill | .................... 359/159 |

FOREIGN PATENT DOCUMENTS

EP    0 881 788 A2    12/1998
JP    07-131422    5/1995

OTHER PUBLICATIONS

Chinese Office Action dated Mar. 3, 2006 in Application No. 200410005274.6, and attached English Translation thereof.

* cited by examiner

*Primary Examiner*—Kenneth Vanderpuye
*Assistant Examiner*—Ken Malkowski
(74) *Attorney, Agent, or Firm*—Renner, Kenner, Greive, Bobak, Taylor & Weber

(57) ABSTRACT

An optical-axis directional indicating apparatus for optical communication includes a photoreceptor having a light-receiving surface and a plurality of optical receiving elements arranged on the surface in a first direction and a second direction orthogonal to the first direction, to receive a transmitted light beam, a detector to detect levels of the light beam received at the optical receiving elements, a plurality of display elements arranged in the first and second directions so as to correspond to the optical receiving elements of the photoreceptor, and a switch circuit to selectively turn on or off the display elements in accordance with the levels of the light beam detected by the detector, to indicate whether or not an optical axis of the light beam is deviated in the first and/or the second direction on the light-receiving surface of the photoreceptor.

12 Claims, 15 Drawing Sheets

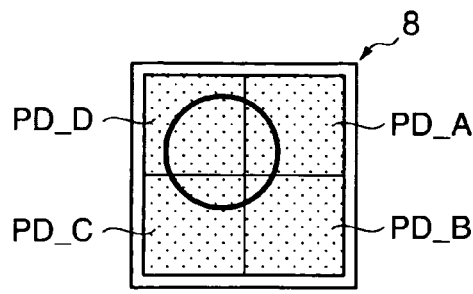
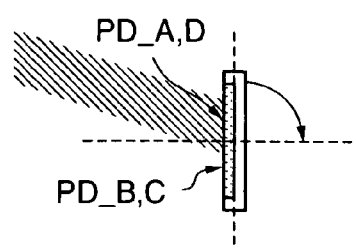
FIG. 2A
(RELATED ART)
FIG. 2B
(RELATED ART)
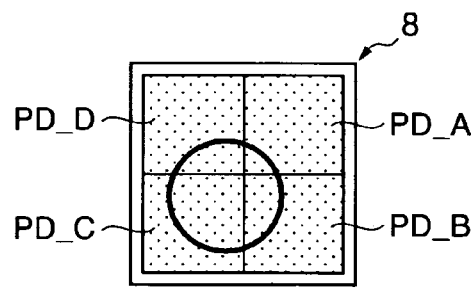
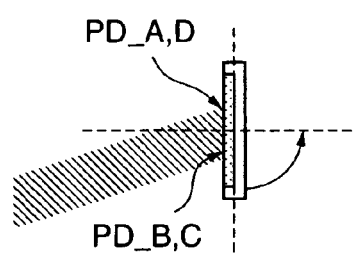
FIG. 3A
(RELATED ART)
FIG. 3B
(RELATED ART)
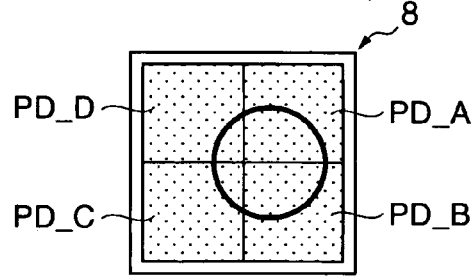
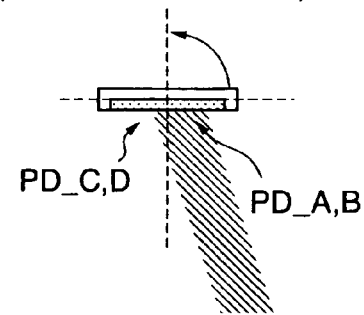
FIG. 4A
(RELATED ART)
FIG. 4B
(RELATED ART)
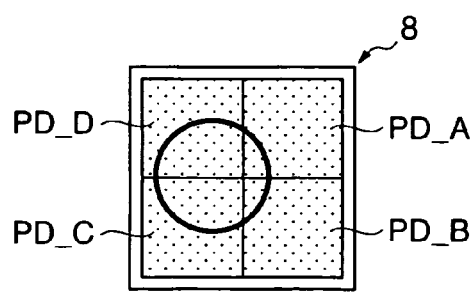
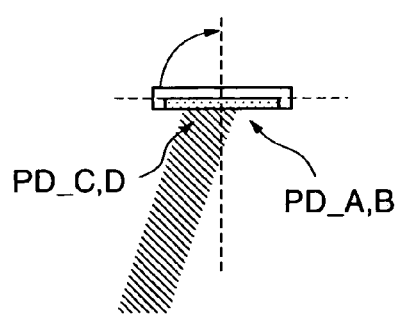
FIG. 5A
(RELATED ART)
FIG. 5B
(RELATED ART)

OPTICAL-AXIS DIRECTIONAL INDICATING APPARATUS FOR OPTICAL COMMUNICATION

BACKGROUND OF THE INVENTION

The present invention relates to an optical-axis directional indicating apparatus to be used in adjustments to the optical axis of an optical wireless communications system.

In optical wireless communications systems, a photoemitter transmits an infrared beam modulated with data signals and then a photoreceptor receives and demodulates the modulated infrared beam, thus achieving data transmission.

Higher transfer speed requires larger amount of light received at the photoreceptor, which further requires a focused beam from the photoemitter for higher light intensity. These requirements are satisfied by optical-axis adjustments between the photoemitter and the photoreceptor.

A known optical wireless communications system, such as illustrated in FIG. 1, employs optical-axis adjustments using a pilot beam.

In FIG. 1, the optical wireless communications system consists of a base unit 1 and a local unit 2.

The base unit 1 has a photoemitter 3 for emitting a data beam (carrying data) for data transmission, a pilot-beam emitter 4 for emitting a divergent beam (pilot beam) having a frequency different from that of the data beam, and a data receptor 5 for receiving data beam transmitted from the local unit 2.

The local unit 2 has a photoemitter 6 and a photoreceptor 7 both rotatable in a horizontal and also a vertical direction. It receives the pilot beam emitted by the pilot-beam emitter 4 of the base unit 1 while the photoemitter 6 and the photoreceptor 7 are rotating in the horizontal and vertical directions. The photoemitter 6 and the photoreceptor 7 stop at the maximum level of received light for optical-axis adjustments between the base unit 1 and the local unit 2. The photoreceptor 7 receives both of the data beam and the pilot beam, which may, however, be separated into two receiving sections to receive the data beam and the pilot beam separately.

As illustrated in FIGS. 2A to 5B, the photoreceptor 7 of the local unit 2 has a quadrant PD (photodiode) 8 having 2×2 PD cells in a horizontal and a vertical direction. Four PD cells PD_A PD_B, PD_C and PD_D are arranged into a 2×2 matrix in a package. Each PD cell performs photoelectric conversion to detect an electric signal carried by the data or pilot beam.

FIG. 6 shows a circuit block diagram installed in the local unit 2 of the known optical wireless communications system (FIG. 1), for rotating the unit 2 in the horizontal and vertical directions in optical-axis adjustments.

The operation of the circuit diagram is explained with reference to a flowchart shown in FIG. 7.

Step S1 at the photoreceptor 7: A pilot beam transmitted from the base unit 1 is received at the photoreceptor 7 of the local unit 2. Electric signals (Dir_A Dir_B, Dir_C and Dir_D) are detected from the pilot beam by the PD cells PD_A PD_B, PD_C and PD_D of the quadrant PD 8. The electric signals are converted into voltages and amplified by amplifiers 9.

Steps S2 to S6 at a controller 10: The amplified signals (Dir_A Dir_B, Dir_C and Dir_D) are selected by a switch 11 under control by a microcomputer 14. Each selected signal is amplified by an amplifier 12 and detected by a level detector 13 for its amplified DC level. The detected DC levels are sequentially supplied to the microcomputer 14 and compared with each other.

Steps S7 to S12 at a motor unit 15: A tilt (vertical) motor Mt and a pan (horizontal) motor Mp are driven by the microcomputer 14 to rotate the quadrant PD 8 so that the PD cells PD_A PD_B, PD_C and PD_D can receive the same amount of light.

Steps S5 to S12 are explained in detail.

Optical-adjustments in the vertical direction TILT:

(1) Comparison is made between addition of the levels of light received at the PD cells PD_A and PD_D and addition of the levels of light received at the PD cells PD_B and PD_C (step S5).

(2) If the former addition and the latter addition are equal to each other in step S5, the spot of pilot beam must have been received at the center of the quadrant PD 8 in the vertical direction TILT (step S5→step S9).

(3) If the former addition is larger than the latter addition in step S5, the spot of pilot beam must have been received at the upper section of the quadrant PD 8, as illustrated in FIGS. 2A and 2B. The tilt motor Mt is driven to tilt the quadrant PD 8 upwards, as indicated by an arrow in FIG. 2B. (step S6→step S7).

(4) If the former addition is smaller than the latter addition in step S5, the spot of pilot beam must have been received at th lower section of the quadrant PD 8, as illustrated in FIGS. 3A and 3B. The tilt motor Mt is driven to tilt the quadrant PD 8 downwards, as indicated by an arrow in FIG. 3B. (step S6→step S8).

(5) The procedures (3) and (4) are repeated so that the spot of pilot beam can be received at the center of the quadrant PD 8 in the vertical direction TILT.

Optical-adjustments in the horizontal direction PAN:

(6) Comparison is made between addition of the levels of light received at the PD cells PD_A and PD_B and addition of the levels of light received at the PD cells PD_C and PD_D (step S9).

(7) If the former addition and the latter addition are equal to each other in step S9, the spot of pilot beam must have been received at the center of the quadrant PD 8 in the horizontal direction PAN (step S9→END).

(8) If the former addition is larger than the latter addition in step S9, the spot of pilot beam must have been received at the right section of the quadrant PD 8, as illustrated in FIGS. 4A and 4B. The pan motor Mp is driven to turn the quadrant PD 8 right, as indicated by an arrow in FIG. 4B. (step S10→step S11).

(9) If the former addition is smaller than the latter addition in step S9, the spot of pilot beam must have been received at the left section of the quadrant PD 8, as illustrated in FIGS. 5A and 5B. The pan motor Mp is driven to turn the quadrant PD 8 left, as indicated by an arrow in FIG. 5B. (step S10→step S12).

(10) The procedures (8) and (9) are repeated so that the spot of pilot beam can be received at the center of the quadrant PD 8 in the horizontal direction PAN.

The known optical wireless communications system employs the automatic optical-axis adjusting technique explained above so that a user can easily set the local unit 2. Thus, this system requires a microcomputer and the peripheral circuitry for automatically driving gears of the motors Mt and Mp, etc., which makes the local unit 2 bulk and expensive.

Another known optical wireless communications system employing a manual optical-axis adjustment technique is disclosed in Japanese Unexamined Patent publication No. 7

(1995)-131422. In this optical-axis adjustment technique, the level of transmitted light is detected and displayed on a level monitor.

Monitoring the level of transmitted light on display or by sound is applied to adjustments to the direction of an antenna of a TV set towards an antenna of a TV station.

Monitoring the level of transmitted light on display or by sound like disclosed in the above Japanese Unexamined Patent publication, however, forces a user to adjust the optical axis upwards, downwards, right or left by cut and try because he or she dose not know in which direction the optical axis should be adjusted, which is troublesome and takes much time.

SUMMARY OF THE INVENTION

A purpose of the present invention is to provide a user-friendly optical-axis directional indicating apparatus to be used in adjustments to the optical axis of an optical wireless communications system.

The present invention provides an optical-axis directional indicating apparatus for optical communication comprising: a photoreceptor having a light-receiving surface and a plurality of optical receiving elements arranged on the surface in a first direction and a second direction orthogonal to the first direction, to receive a transmitted light beam; a detector to detect levels of the light beam received at the optical receiving elements; a plurality of display elements arranged in the first and second directions so as to correspond to the optical receiving elements of the photoreceptor; and a switch circuit to selectively turn on or off the display elements in accordance with the levels of the light beam detected by the detector, to indicate whether or not an optical axis of the light beam is deviated in the first and/or the second direction on the light-receiving surface of the photoreceptor.

Furthermore, the present invention provides an optical wireless communications system comprising: a first optical wireless communications apparatus for transmitting a light beam; and a second optical wireless communications apparatus for receiving the light beam, the second optical wireless communications apparatus including: a photoreceptor having a light-receiving surface and a plurality of optical receiving elements arranged on the surface in a first direction and a second direction orthogonal to the first direction, to receive the light beam; a detector to detect levels of the light beam received at the optical receiving elements; a plurality of display elements arranged in the first and second directions so as to correspond to the optical receiving elements of the photoreceptor; and a switch circuit to selectively turn on or off the display elements in accordance with the levels of the light beam detected by the detector, to indicate whether or not an optical axis of the light beam is deviated in the first and/or the second direction on the light-receiving surface of the photoreceptor.

Moreover, the present invention provides an optical wireless communications system comprising: a first optical wireless communications apparatus for transmitting a light beam; and a second optical wireless communications apparatus, connected to a monitor screen, for receiving the light beam, the second optical wireless communications apparatus including: a photoreceptor having a light-receiving surface and a plurality of optical receiving elements arranged on the surface in a first direction and a second direction orthogonal to the first direction, to receive the light beam; a detector to detect levels of the light beam received at the optical receiving elements; and an on-screen generator to generate an on-screen signal in accordance with the levels of the light beam detected by the detector and sending the on-screen signal to the monitor screen to display a plurality of indications arranged in the first and second directions so as to correspond to the optical receiving elements of the photoreceptor, the indications being selectively turned on or off in accordance with the levels of the light beam detected by the detector, to indicate whether or not an optical axis of the light beam is deviated in the first and/or the second direction on the light-receiving surface of the photoreceptor.

Furthermore, the present invention provides an optical wireless communications system to be used for a video system having a video supply apparatus and a video display apparatus placed apart from each other comprising: a first optical wireless communications apparatus, provided for the video supply apparatus, for transmitting a light beam carrying a video signal to the video display apparatus; and a second optical wireless communications apparatus, provided for the video display apparatus, for receiving the light beam, the second optical wireless communications apparatus including: a photoreceptor having a light-receiving surface and a plurality of optical receiving elements arranged on the surface in a first direction and a second direction orthogonal to the first direction, to receive the light beam; a detector to detect levels of the light beam received at the optical receiving elements; and an on-screen generator to generate an on-screen signal in accordance with the levels of the light beam detected by the detector and sending the on-screen signal to the video display apparatus to display a plurality of indications arranged in the first and second directions so as to correspond to the optical receiving elements of the photoreceptor, the indications being selectively turned on or off in accordance with the levels of the light beam detected by the detector, to indicate whether or not an optical axis of the light beam is deviated in the first and/or the second direction on the light-receiving surface of the photoreceptor.

BRIEF DESCRIPTION OF DRAWINGS

FIGS. 2A to 5B illustrate pilot beams spotted on several section of a quadrant PD in the known optical wireless communications system;

DETAILED DESCRIPTION OF PREFERRED EMBODIMENT

Disclosed next with reference to the drawings are several embodiments of optical-axis directional indicating apparatuses according to the present invention. Elements in each embodiment the same as or analogous to those of another embodiment are given the same reference numbers.

First Embodiment

Figure 8:
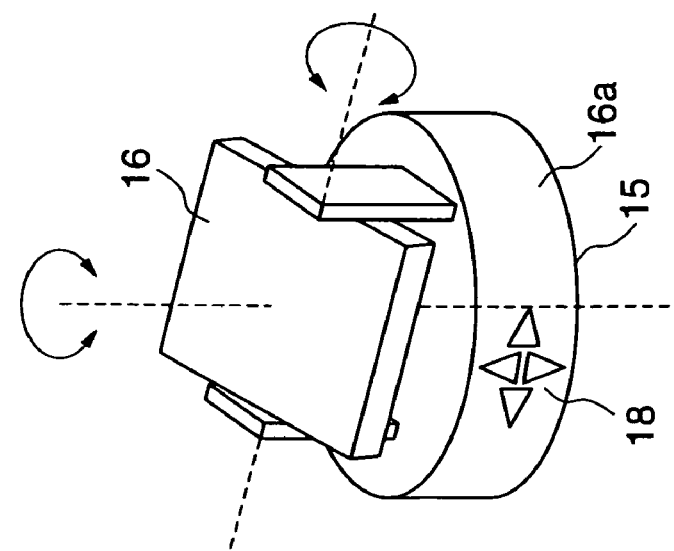
FIG. 8 illustrates a local unit employing a first embodiment of an optical-axis directional indicating apparatus according to the present invention.

Illustrated in FIG. 8 is a local unit 15 employing a first embodiment of an optical-axis directional indicating apparatus according to the present invention.

The local unit 15 consists of an optical transceiver 16 and a base 16a. It is equipped with a manual rotary mechanism with which a user can freely rotate it in horizontal and vertical directions. In detail, the optical transceiver 16 is manually rotatable in the vertical direction on the base 16a while the base 16a is manually rotatable in the horizontal direction. The base 16a is equipped with a directional-indicating LED (light-emitting diode) 18 which indicates four rotary directions (up, down, right and left) to a user. The LED 18 is formed like arrows indicating the four rotary directions, as illustrated in FIG. 8.

Figure 9:
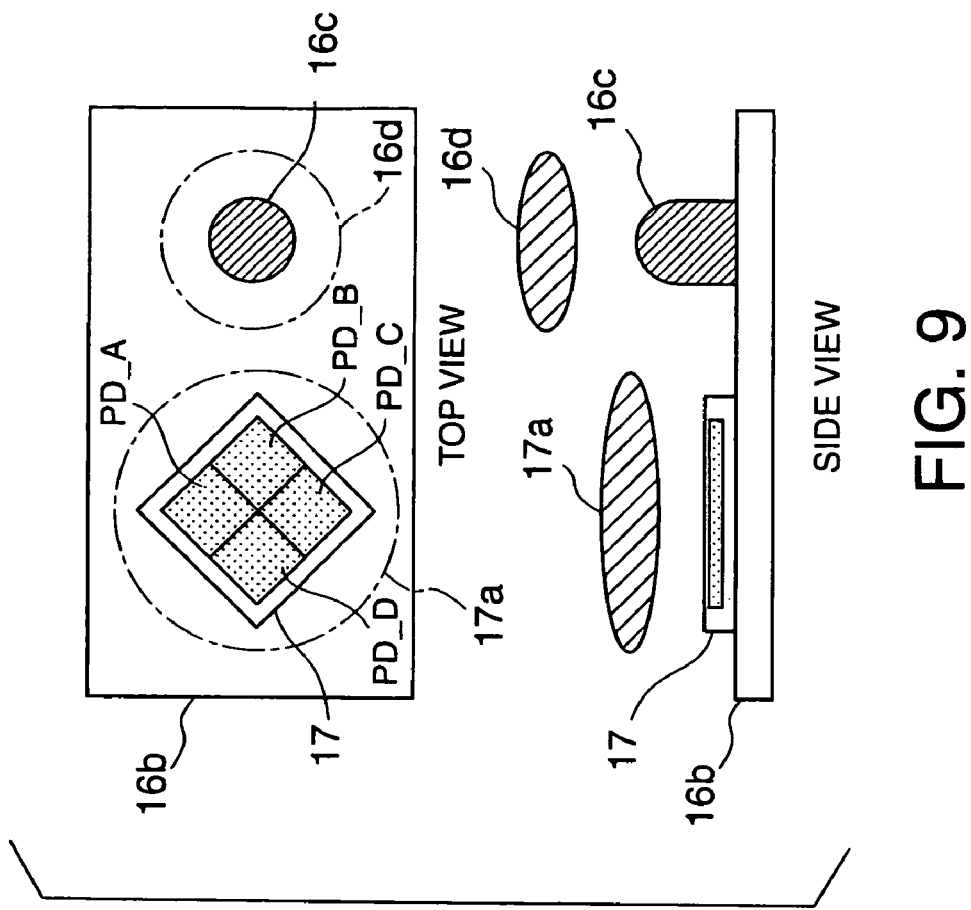
FIG. 9 illustrates a top view and a side view of an optical transceiver installed in the local unit shown in FIG. 8.

Illustrated in FIG. 9 are a top view and a side view of the optical transceiver 16.

Provided on a substrate 16b are a quadrant PD 17 having an optical receiving lens 17a and a photoemitter 16c having an optical transmitting lens 16d. The quadrant PD 17 receives both a pilot beam and a data beam (carrying data), which may, however, be separated into two receiving sections to receive the pilot beam and the data beam separately. The photoemitter 16c transmit a data beam.

Figure 1:
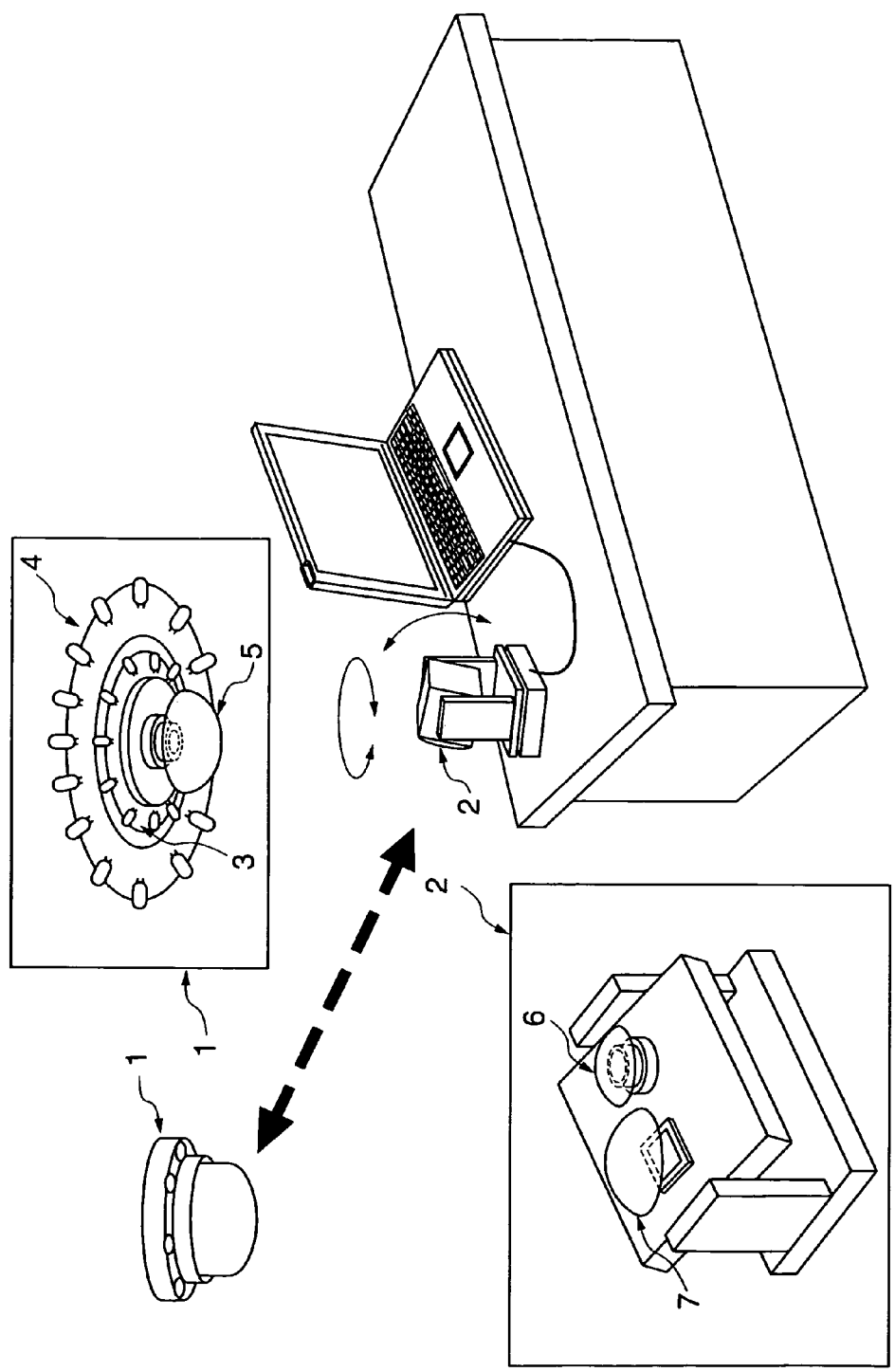
FIG. 1 illustrates a known optical wireless communications system.
Figure 6:
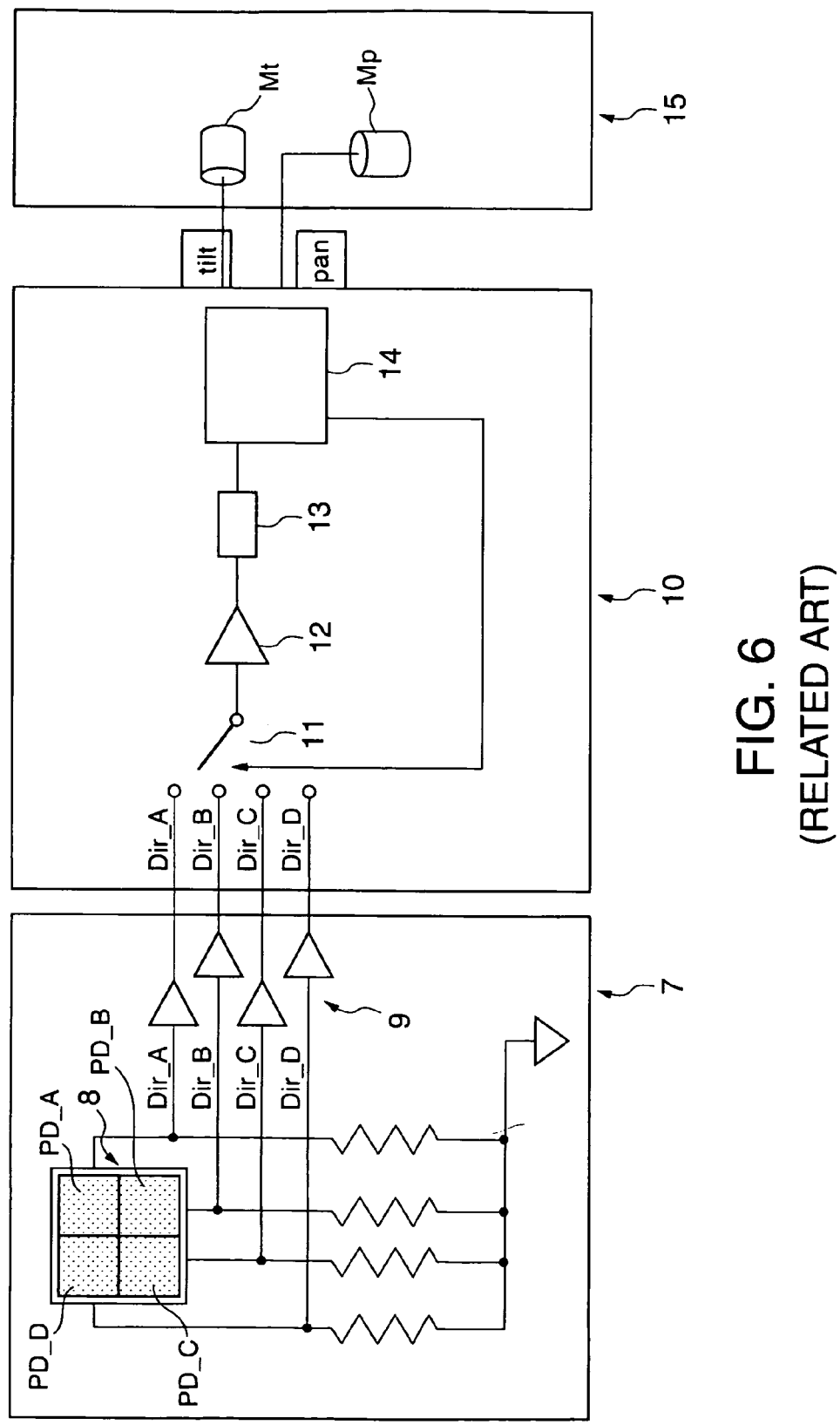
FIG. 6 shows a circuit block diagram of a known optical-axis adjusting apparatus.
Figure 7:
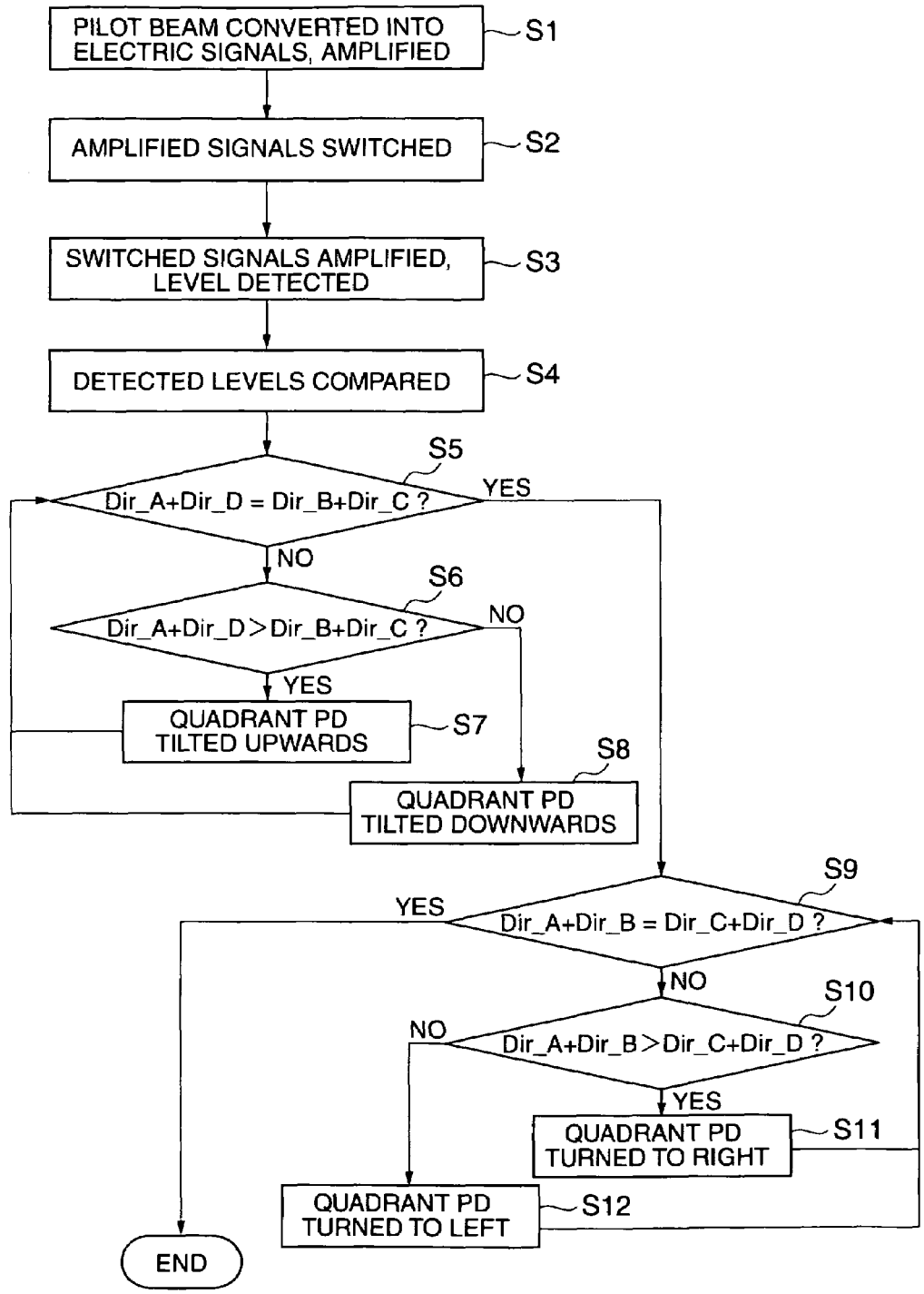
FIG. 7 shows a flowchart indicating the operation of the known optical-axis adjusting apparatus.

The quadrant PD 17 has 2×2 PD cells, as illustrated in the top view, which are shifted by 45 degrees against the counterparts of the known quadrant PD 8 (FIG. 6) arranged in the horizontal and vertical directions. In detail, four PD cells are arranged in the directions in which the optical transceiver 16 is allowed to rotate: PD cells. PD_A (upper), PD_B (right), PD_C (lower) and PD_D (left).

Figure 10:
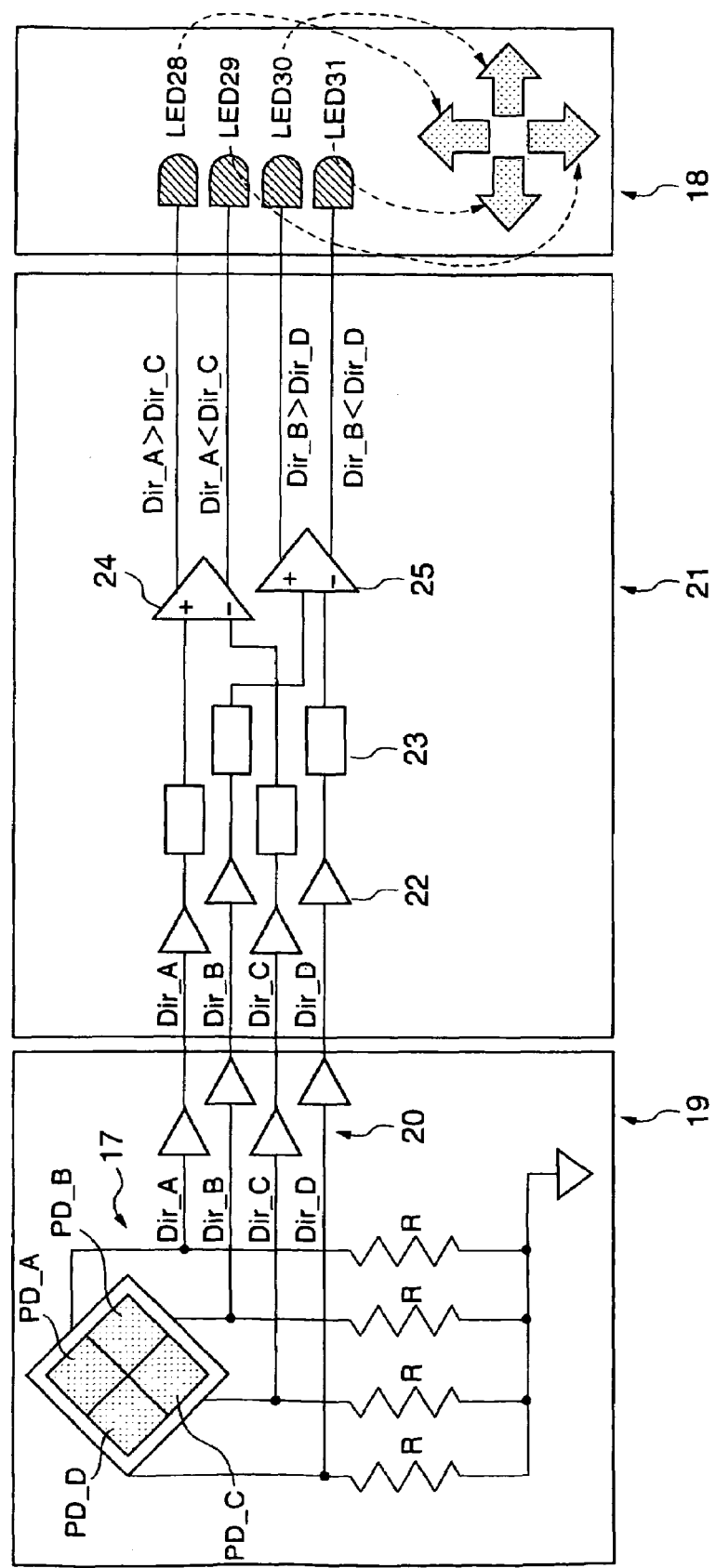
FIG. 10 shows a circuit block diagram of the first embodiment of the optical-axis directional indicating apparatus according to the present invention.

FIG. 10 shows a circuit block diagram of a first embodiment of an optical-axis directional indicating apparatus according to the present invention.

Figure 11:
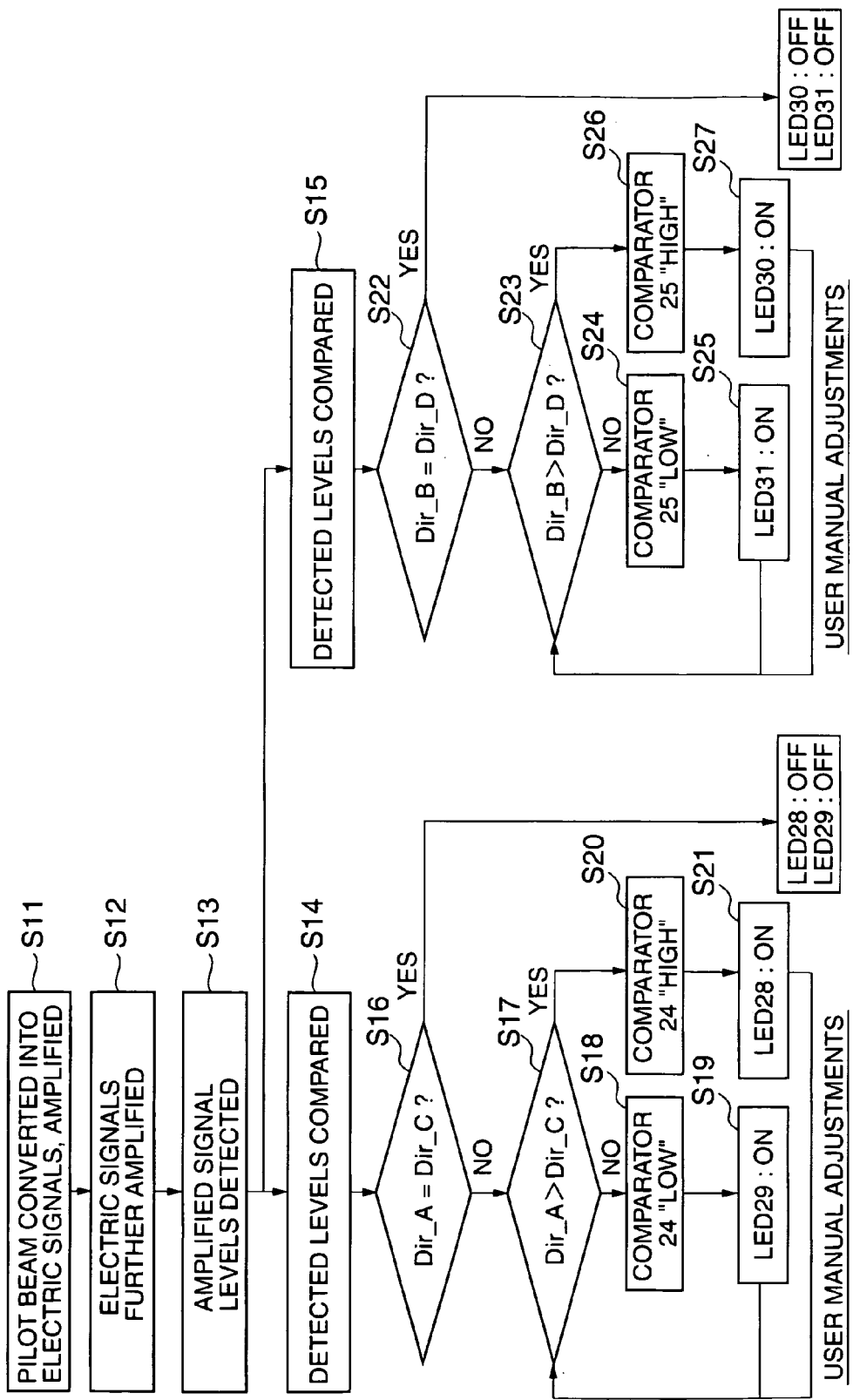
FIG. 11 shows a flowchart indicating the operation of the first embodiment of the optical-axis directional indicating apparatus according to the present invention.

The operation of the first embodiment of the optical-axis directional indicating apparatus is explained with reference to a flowchart shown in FIG. 11.

Step S11 at a photoreceptor 19 in the optical transceiver 16: A pilot beam transmitted externally is received at the photoreceptor section 19. Electric signals (Dir_A Dir_B, Dir_C and Dir_D) are detected from the pilot beam by the PD cells PD_A PD_B, PD_C and PD_D of the quadrant PD 17. The electric signals are converted into voltages through resistors R and amplified by amplifiers 20.

Steps S12 to S27 at a controller 21: The amplified signals (Dir_A, Dir_B, Dir_C and Dir_D) are further amplified by amplifiers 22 and detected by level detectors 23 for their amplified DC levels. The detected DC levels are compared with each other by comparators 24 and 25. The output of each comparator is supplied to the corresponding LED segment among four LED segments 28, 29, 30 and 31 of the directional-indicating LED 18 (FIG. 8) to indicate a user a direction in which the optical transceiver 16 should be rotated. The LED segments 28, 29, 30 and 31 are formed like arrows to indicate upwards, downwards, right and left, respectively.

Steps S14 to S27 are explained in detail for user-manual adjustments to achieve the same amount of light to be received at the PD cells PD_A PD_B, PD_C and PD_D of the quadrant PD 17.

(1) Comparison is made between the level of light received at the PD cell PD_A and the level of light received at the PD cell PD_C (step S14). Comparison is also made between the level of light received at the PD cell PD_B and the level of light received at the PD cell PD_D (step S15).

(2) In step S14, if the former level is larger than the latter level, the output of the comparator 24 becomes "high" to turn on the LED segment 28 indicating upwards (NO in step S16→YES in step S17→steps S20, 21).

(3) In step S14, if the former level is smaller than the latter level, the output of the comparator 24 becomes "low" to turn on the LED segment 29 indicating downwards (NO in step S16→NO step S17→steps S18, 19).

(4) In step S14, if the former level is equal to the latter level, both LED segments 28 and 29 are turned off (YES in step S16).

(5) In step S15, if the former level is larger than the latter level, the output of the comparator 25 becomes "high" to turn on the LED segment 30 indicating right (NO in step S22→YES in step S23→steps S26, 27).

(6) In step S15, if the former level is smaller than the latter level, the output of the comparator 25 becomes "low" to turn on the LED segment 31 indicating left (NO in step S22→NO in step S23→steps S24, 25).

(7) In step S15, if the former level is equal to the latter level, both LED segments 30 and 31 are turned off (YES in step S22).

Figure 12:
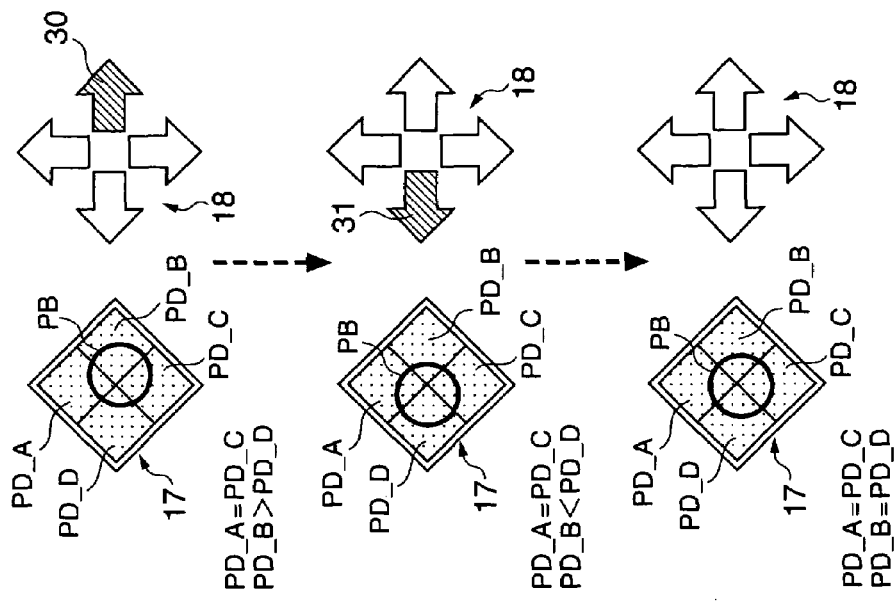
FIG. 12 illustrates manual optical-axis adjustments employing the first embodiment of the optical-axis directional indicating apparatus according to the present invention.
Figure 13:
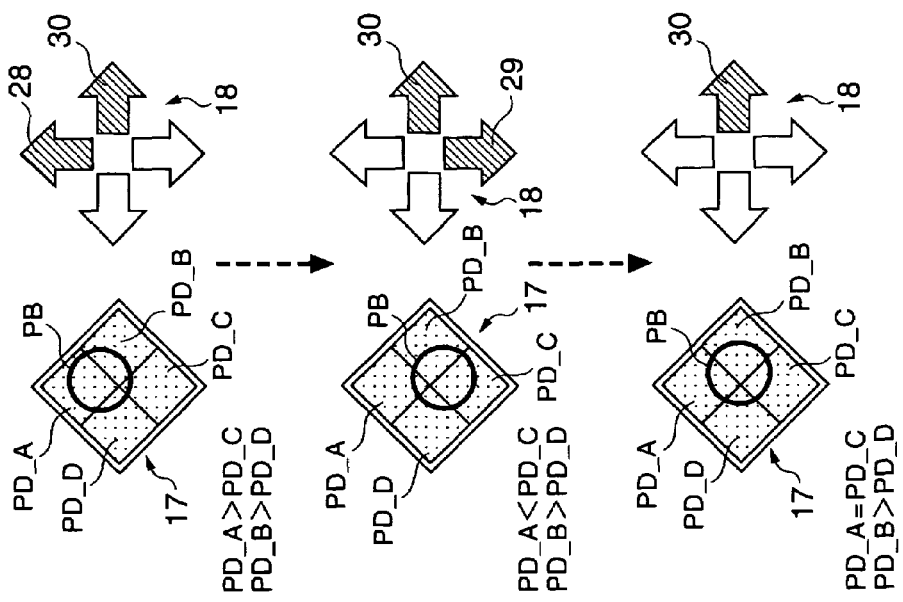
FIG. 13 illustrates manual optical-axis adjustments employing the first embodiment of the optical-axis directional indicating apparatus according to the present invention.

Steps S14 to S27 are illustrated in FIGS. 12 and 13.

The upper illustrations of FIG. 12 show that a pilot beam PB is spotted on the upper right section of the quadrant PD 17, so that the level of light received at the PD cell PD_A is larger than that at PD_C and also the level of light received at the PD cell PD_B is larger than that at PD_D (PD_A>PD_C, PD_B>PD_D), and the LED segments 28 and 30 of the directional-indicating LED 18 are turned on to indicate the upper-right direction. Then, a user tilts the optical transceiver 16 upwards.

The middle illustrations of FIG. 12 show that the pilot beam PB is spotted on the lower right section of the quadrant PD 17, so that the level of light received at. the PD cell PD_A is smaller than that at PD_C whereas the level of light received at the PD cell PD_B is still larger than that at PD_D (PD_A <PD_C, PD_B>PD_D), and the LED segments 29 and 30 of the directional-indicating LED 18 are turned on to indicate the lower-right direction. Then, the user tilts the optical transceiver 16 downwards.

The lower illustrations of FIG. 12 show that the pilot beam PB is spotted on the right section of the quadrant PD 17, so that the level of light received at the PD cell PD_A and that at PD_C are equal to each other whereas the level of light received at the PD cell PD_B is still larger than that at PD_D (PD_A =PD_C, PD_B>PD_D), and the LED segment 30 only is turned on to indicate the right direction.

The upper illustrations of FIG. 13 are equivalent to the lower illustrations of FIG. 12. Then, the user turns the optical transceiver 16 right.

The middle illustrations of FIG. 13 show that the pilot beam PB is spotted on the left section of the quadrant PD 17, so that the level of light received at the PD cell PD_A and that at PD_C are equal to each other whereas the level of light received at the PD cell PD_B is smaller than that at PD_D (PD_A=PD_C, PD_B<PD_D), and the LED segments 31 of the directional-indicating LED 18 only is tuned on to indicate the left direction. Then, the user turns the optical transceiver 16 right.

The lower illustrations of FIG. 13 show that the pilot beam PB is spotted on the center of the quadrant PD 17, so that the level of light received at the PD cell PD_A and that at PD_C are equal to each other and also the level of light received at the PD cell PD_B and that at PD_D are equal to each other (PD_A=PD_C, PD_B=PD_D), and all of the LED segments of the directional-indicating LED 18 are tuned off to indicate that the optical-axis adjustments are completed.

As disclosed, the user manually rotates the optical transceiver 16 in the vertical and/or the horizontal direction in accordance with the indications of the directional-indicating LED 18. Then, he or she can fix the optical transceiver 16 at which all LED segments 28 to 31 of the directional-indicating LED 18 are turned off.

In the first embodiment, all the LED segments 28, 29, 30 and 31 of the directional-indicating LED 18 are turned off when the pilot beam PB is spotted at the center of the quadrant PD 18, or optical-axis adjustments are completed. They may, however, be turned on when the optical-axis adjustments are completed.

Figure 14:
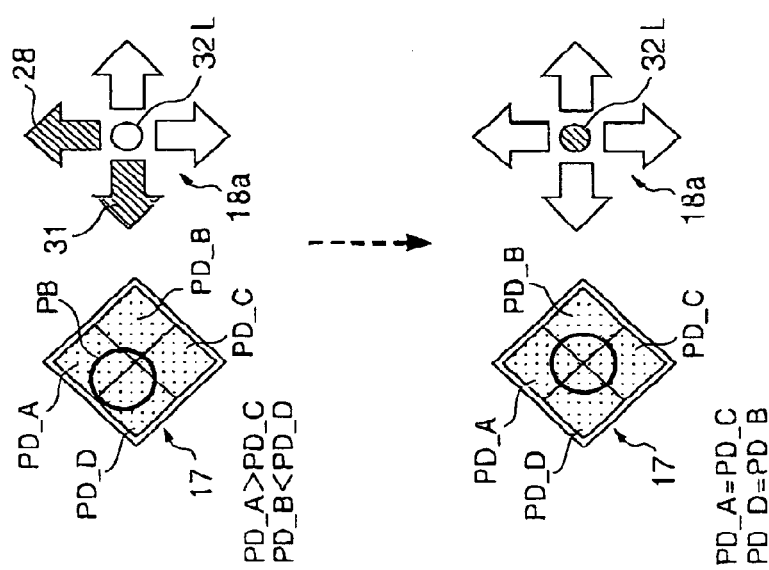
FIG. 14 illustrates a modification to the first embodiment of the optical-axis directional indicating apparatus according to the present invention.

Illustrated in FIG. 14 is a modification to the first embodiment of the optical-axis directional indicating apparatus according to the present invention.

The modification employs a communication-available displaying LED 32L which may be provided at the center of a directional-indicating LED 18a. Or, it may be provided at any section of the local unit 15 (FIG. 8) for a user to easily notice it. The inputs of the four LED segments 28 to 31 are connected to the LED 32L via known logic gate in FIG. 10.

The communication-available displaying LED 32L turns on to indicate for a user that the optical-axis adjustments are completed for the local unit 15. Whereas, it turns off to indicate for the user that the local unit 15 requires optical-axis readjustments.

In FIG. 14, the four PD cells of the quadrant PD 17 selectively turn on in accordance with the differences in levels of received light, or the mismatch between the optical axes of the local unit 15 and, for example, a base unit, in the vertical and/or the horizontal direction, like the first embodiment.

The communication-available displaying LED 32L turns on only when the PD cells PD_A and PD_C are equal to each other on the amount of received light and also the PD cells PD_B and PD_D are equal to each other on the amount of received light, to indicate that optical communications are available.

In detail, the upper illustrations of FIG. 14 show that a pilot beam PB is spotted on the upper left section of the quadrant PD 17, so that the level of light received at the PD cell PD_A is larger than that at PD_C whereas the level of light received at the PD cell PD_B is smaller than that at PD_D (PD_A>PD_C, PD_B<PD_D), and the LED segments 28 and 31 of the directional-indicating LED 18a are turned on to indicate the upper-left direction, with the communication-available displaying LED 32 being off. Then, the user tilts the optical transceiver 16 upwards and also turns it left.

The lower illustrations of FIG. 14 show that the pilot beam PB is spotted on the center of the quadrant PD 17, so that the level of light received at the PD cell PD_A and that at PD_C are equal to each other and also the level of light received at the PD cell PD_B and that at PD_D are equal to each other (PD_A=PD_C, PD_B=PD_D), and all the LED segments of the directional-indicating LED 18a are tuned off whereas the communication-available displaying LED 32L is turned on, to indicate that the optical-axis adjustments are completed.

Second Embodiment

Figure 15:
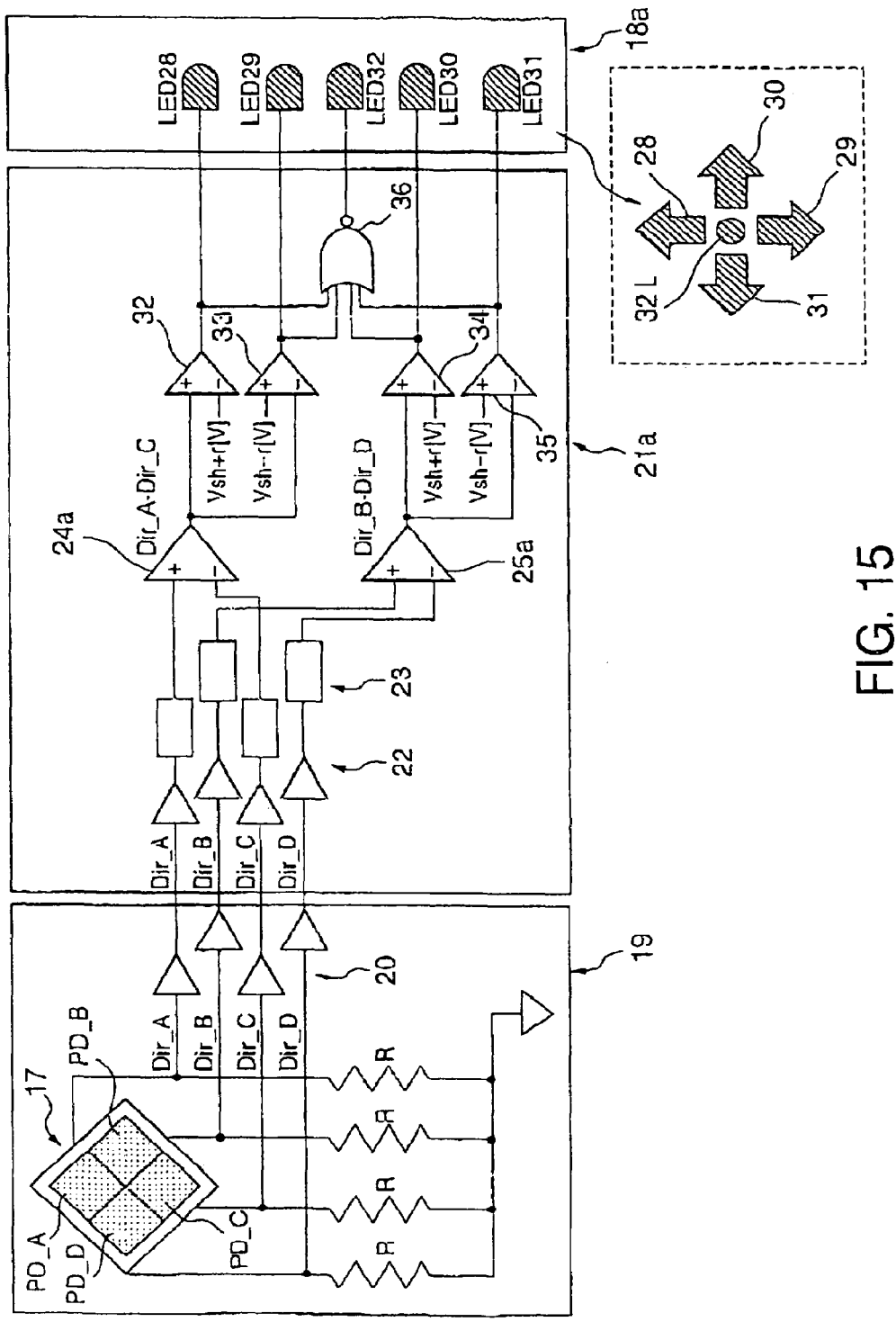
FIG. 15 shows a circuit block diagram of a second embodiment of an optical-axis directional indicating apparatus according to the present invention.

Shown in FIG. 15 is a second embodiment of an optical-axis directional indicating apparatus according to the present invention applicable to a wide range of level of light for communications in which communications are available when a pilot beam is spotted on not only at the center of the quadrant PD 17 but also at sections dose to the center.

The communication-available displaying LED 32L in the second embodiment turns on when the difference in level of light received at the PD cells PD_A and PD_C and also the difference in level of light received at the PD cells PD_B and PD_D are both lie within a specific range, as disclosed below.

At the photoreceptor 19: A pilot beam transmitted externally is received at the quadrant PD 17. Electric signals (Dir_A, Dir_B, Dir_C and Dir_D) are detected from the pilot beam by the PD cells PD_A PD_B, PD_C and PD_D of the quadrant PD 17. The electric signals are converted into voltages through the resistors R and amplified by the amplifiers 20.

At a controller 21a: The amplified signals (Dir_A Dir_B, Dir_C and Dir_D) are further amplified by the amplifiers 22 and detected by the level detectors 23 for their amplified DC levels. The differences in DC levels are detected by differential amplifies 24a and 25a in the vertical and horizontal directions.

The difference in DC levels (Dir_A−Dir_C) is supplied to a comparator 32 and compared with a reference level (Vsh+r) and also supplied to a comparator 33 and compared with a reference level (Vsh−r). The difference in DC levels (Dir_B−Dir_D) is supplied to a comparator 34 and compared with a reference level (Vsh−r) and also supplied to a comparator 35 and compared with a reference level (Vsh−r).

The sign "Vsh" indicates a voltage output from each differential amplifier 24a or 25a when the difference in DC levels (Dir_A–Dir_C) in the vertical direction or the difference in DC levels (Dir_B–Dir_D) in the horizontal direction is zero. The sign "r" indicates a reference voltage level given based on a communication-allowable range which depends on required level of light for communications.

The difference in DC levels of received light within the reference voltage level "±r" allows communications, as disclosed below.

(1) When the level of light received at the PD cell PD_A is higher than that at PD_C by "r" or more, or (Dir_A–Dir_C)>(Vsh+r), the output of the comparator 32 becomes "high" to turn on the LED segment 28 indicating upwards.

(2) When the level of light received at the PD cell PD_C is higher than that at PD_A by "r" or more, or (Dir_A–Dir_C)<(Vsh−r), the output of the comparator 33 becomes "high" to turn on the LED segment 29 indicating downwards.

(3) When the difference in the level of light between the PD cells PD_A and PD_C is "r" or less, or (Vsh−r)<(Dir_A–Dir_C)<(Vsh+r), the outputs of the comparators 32 and 33 become "low" to turn off the LED segments 28 and 29.

(4) When the level of light received at the PD cell PD_B is higher than that at PD_D by "r" or more, or (Dir_B–Dir_D)>(Vsh+r), the output of the comparator 34 becomes "high" to turn on the LED segment 30 indicating right.

(5) When the level of light received at the PD cell PD_D is higher than that at PD_B by "r" or more, or (Dir_B–Dir_D)<(Vsh−r), the output of the comparator 35 becomes "high" to turn on the LED segment 31 indicating left.

(6) When the difference in the level of light between the PD cells PD_B and PD_D is "r" or less, or (Vsh−r)<(Dir_B–Dir_D)<(Vsh+r), the output of the comparators 34 and 35 become "low" to turn off the LED segments 30 and 31.

(7) When the difference in the level of light between the PD cells PD_A and PD_C is "r" or less, or (Vsh−r)≦? (Dir_A–Dir_C)≦? (Vsh+r), and also when the difference in the level of light between the PD cells PD_B and PD_D is "r" or less, or (Vsh−r)≦? (Dir_B–Dir_D)≦? (Vsh+r), the outputs of the comparators 32 to 34 are supplied to a NOR gate 36 to turn on the communication-available displaying LED 32L indicating that communications are available because the quadrant PD 17 is receiving a pilot beam almost at its center.

Third Embodiment

Figure 16:
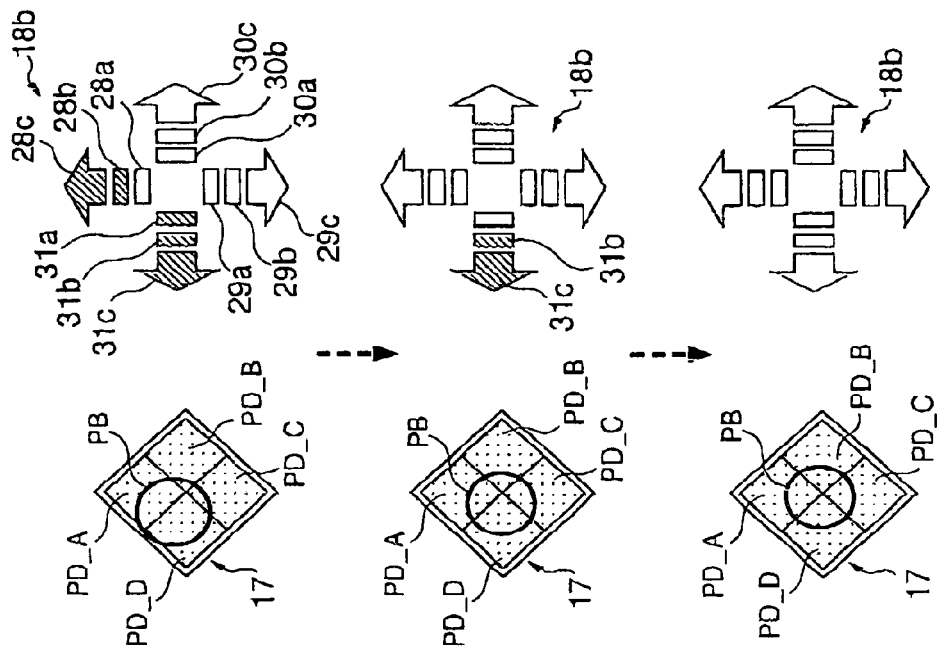
FIG. 16 illustrates manual optical-axis adjustments employing a third embodiment of an optical-axis directional indicating according to the present invention.

Illustrated in FIG. 16 is a directional-indicating LED 18b used in a third embodiment of an optical-axis directional indicating apparatus according to the present invention.

The directional-indicating LED 18b may be provided on the base 16a of the local unit 15 (FIG. 8). The LED 18b is equipped with several LED segments 28a to 28c, 29a to 29c, 30a to 30c, and 31a to 31c to precisely indicate the difference in levels of light received at the PD cells PD_A and PD_C, and also PD_B and PD_D in accordance with the stages of light levels. The directional-indicating LED 18b may be an analog-based or a digital-based indicator.

Figure 17:
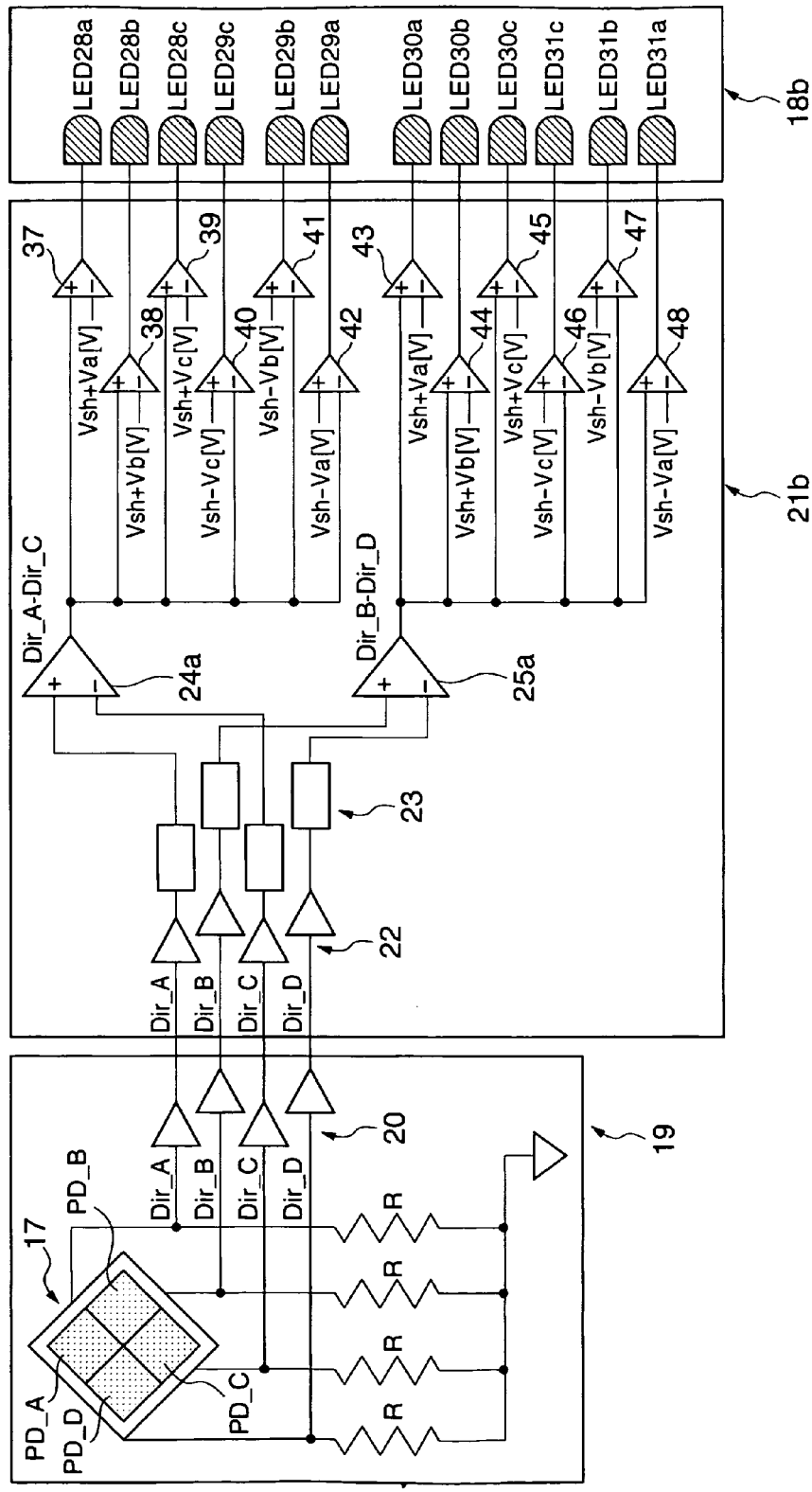
FIG. 17 shows a circuit block diagram of the third embodiment of the optical-axis directional indicating apparatus according to the present invention.

FIG. 17 shows a circuit block diagram of the third embodiment of the optical-axis directional indicating apparatus according to the present invention.

At the photoreceptor 19: A pilot beam transmitted externally is received at the quadrant PD 17. Electric signals (Dir_A Dir_B, Dir_C and Dir_D) are detected from the pilot beam by the PD cells PD_A PD_B, PD_C and PD_D of the quadrant PD 17. The electric signals are converted into voltages through the resistors R and amplified by the amplifiers 20.

At a controller 21b: The amplified signals (Dir_A Dir_B, Dir_C and Dir_D) are further amplified by the amplifiers 22 and detected by the level detectors 23 for their amplified DC levels.

Figure 18:
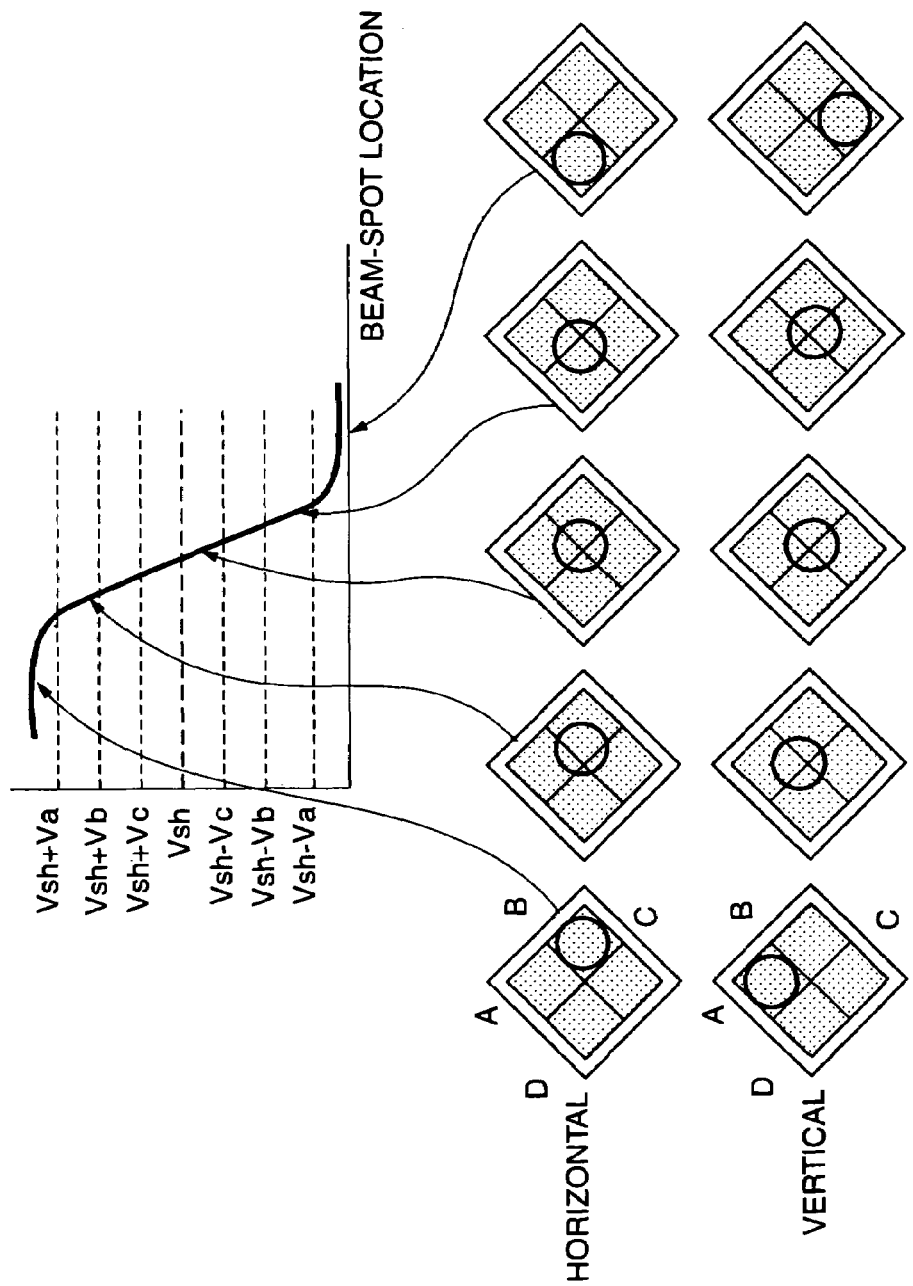
FIG. 18 shows a voltage characteristic curve applied to differential amplifiers installed in the third embodiment of the optical-axis directional indicating apparatus according to the present invention.

The differences in DC levels in the vertical and horizontal directions are detected by the differential amplifies 24a and 25a adjusted to produce the output that varies, as illustrated in FIG. 18, in accordance with the location of the spot of pilot beam on the quadrant PD 17 in the vertical and horizontal directions.

The difference in DC levels (Dir_A–Dir_C) is supplied to comparators 37 to 42 and compared with reference levels (Vsh+Va), (Vsh+Vb), (Vsh+Vc), (Vsh−Vc), (Vsh−Vb), and (Vsh−Va), respectively.

The difference in DC levels (Dir_B–Dir_D) is supplied to comparators 43 to 48 and compared with reference levels (Vsh+Va), (Vsh+Vb), (Vsh+Vc), (Vsh−Vc), (Vsh−Vb), and (Vsh−Va), respectively.

The sign "Vsh" indicates a voltage output from each differential amplifier 24a or 25a when the difference in DC levels (Dir_A–Dir_C) in the vertical direction or the difference in DC levels (Dir_B–Dir_D) in the horizontal direction are both zero. The signs "Va", "Vb" and "Vc" indicate reference voltage levels having the relationship Vmax>Va>Vb>Vc wherein Vmax is the output of the differential amplifier when a pilot beam is incident only to either the PD cell PD_A or PD_C.

The difference in DC levels of received light within the reference voltage level "±Vci" allows communications, as disclosed below.

(1) When the level of light received at the PD cell PD_A is higher than that at PD_C by "Va" or more, or (Dir_A–Dir_C)>(Vsh+Va), the outputs of the comparators 37, 38 and 39 become "high" to turn on the LED segments 28a, 28b and 28c each indicating upwards, as illustrated in FIG. 16. Then, a user tilts the quadrant PD 17 upwards.

(2) When the level of light received at the PD cell PD_A is higher than that at PD_C by "Vb" or more but less than "Va", or (Vsh+Va)≧(Dir_A–Dir_C)>(Vsh+Vb), the outputs of the comparators 38 and 39 become "high" to turn on the LED segments 28b and 28c whereas the output of the comparator 37 becomes "low" to turn off the LED segment 28a. The user tilts the quadrant PD 17 upwards.

(3) When the level of light received at the PD cell PD_A is higher than that at PD_C by "Vc" or more but less than "Vb", or (Vsh+Vb)≧(Dir_A–Dir_C)>(Vsh+Vc), the output of the comparators 39 becomes "high" to turn on the LED segment 28c whereas the outputs of the comparator 37 and 38 become "low" to turn off the LED segments 28a and 28b. The user tilts the quadrant PD 17 upwards.

(4) When the difference in level of light received at the PD cells PD_A and PD_C is equal to or lower than "Vc", or (Vsh+Vc)≧(Dir_A–Dir_C)≧(Vsh−Vc), the outputs of the comparators 37 to 42 become "low" to turn off the LED segments 28a to 28c and also 29a to 29c. The user is confirmed that the quadrant PD 17 receives a pilot beam within an allowable range in the vertical direction.

(5) When the level of light received at the PD cell PD_C is higher than that at PD_A by "Vc" or more but less than "Vb", or (Vsh−Vc)<(Dir_A–Dir_C)≦(Vsh−Vb), the output of the comparator 40 becomes "high" to turn on the LED segment 29c indicating downwards whereas the outputs of the comparators 41 and 42 become "low" to turn off the LED segments 29b and 29a both indicating downwards. The user tilts the quadrant PD 17 downwards.

(6) When the level of light received at the PD cell PD_C is higher than that at PD_A by "Vb" or more but less than "Va", or (Vsh−Vb)<(Dir_A−Dir_C)≦(Vsh−Va), the outputs of the comparators 40 and 41 become "high" to turn on the LED segments 29b and 29c whereas the output of the comparator 42 becomes "low" to turn off the LED segment 29a. The user tilts the quadrant PD 17 downwards.

(7) When the level of light received at the PD cell PD_C is higher than that at PD_A by "Va", or (Vsh−Va)<(Dir_A−Dir_C), the outputs of the comparators 40, 41 and 42 become "high" to turn on the LED segments 29a, 29b and 29c. The user tilts the quadrant PD 17 downwards.

In FIG. 16, the upper illustrations show that a pilot beam PB is spotted on the little-upper left section of the quadrant PD 17, so that the LED segments 28b and 28c indicating upwards and also the LED segments 31a, 31b and 31c indicating left are turned on. Then, the user tilts the optical transceiver 16 upwards a little and also turns it left.

The middle illustrations of FIG. 16 show that the pilot beam PB is spotted on the little left section of the quadrant PD 17, so that the LED segments 31b and 31c indicating left are sill turned on. Then, the user turns the optical transceiver 16 left a little more.

The lower illustrations of FIG. 16 show that the pilot beam PB is spotted at the center of the quadrant PD 17, so that all LED segments are turned off to indicate that the optical axis amendments are completed.

As disclosed above, a user can tilt the quadrant PD 17 upwards or downwards depending on which of the PD segments 28a to 29c is(are) turned on to make fine optical-axis adjustments in the vertical direction. The user can further turn the quadrant PD 17 right or left depending on which of the PD segments 30a to 31c is(are) turned on to make fine optical-axis adjustments in the horizontal direction. The procedures for the optical-axis adjustments in the horizontal direction are basically the same as the procedures (1) to (7) and not disclosed because any skilled in the art understands them.

The above procedures (1) to (7) may be conducted by a processor like a microcomputer instead of the circuit shown in FIG. 17.

Although not shown, four single PDs may be provided in the vertical and horizontal directions instead of the quadrant PD 17 disclosed in the first to third embodiments.

Disclosed below are fourth and fifth embodiments of optical-axis directional indicating apparatuses according to the present invention in which optical-axis mismatch in the vertical and/or the horizontal direction can be displayed on monitor.

In these embodiments, the optical transceiver 16 (FIG. 8) is equipped with an on-screen-signal generator to which the output signals of the controller 21 (FIG. 10), 21a (FIG. 15) or 21b (FIG. 17) are supplied. In response to the output signals from the controller 21, 21a or 21b, the on-screen-signal generator generates an on-screen signal for displaying arrows, like those shown in FIGS. 12, 13, 14 and 16 configured by LED segments, to indicate optical-axis mismatch in the vertical and/or the horizontal direction. Communication-available indications may also be made on monitor like the modification to the first embodiment and the second embodiment.

Fourth Embodiment

Figure 19:
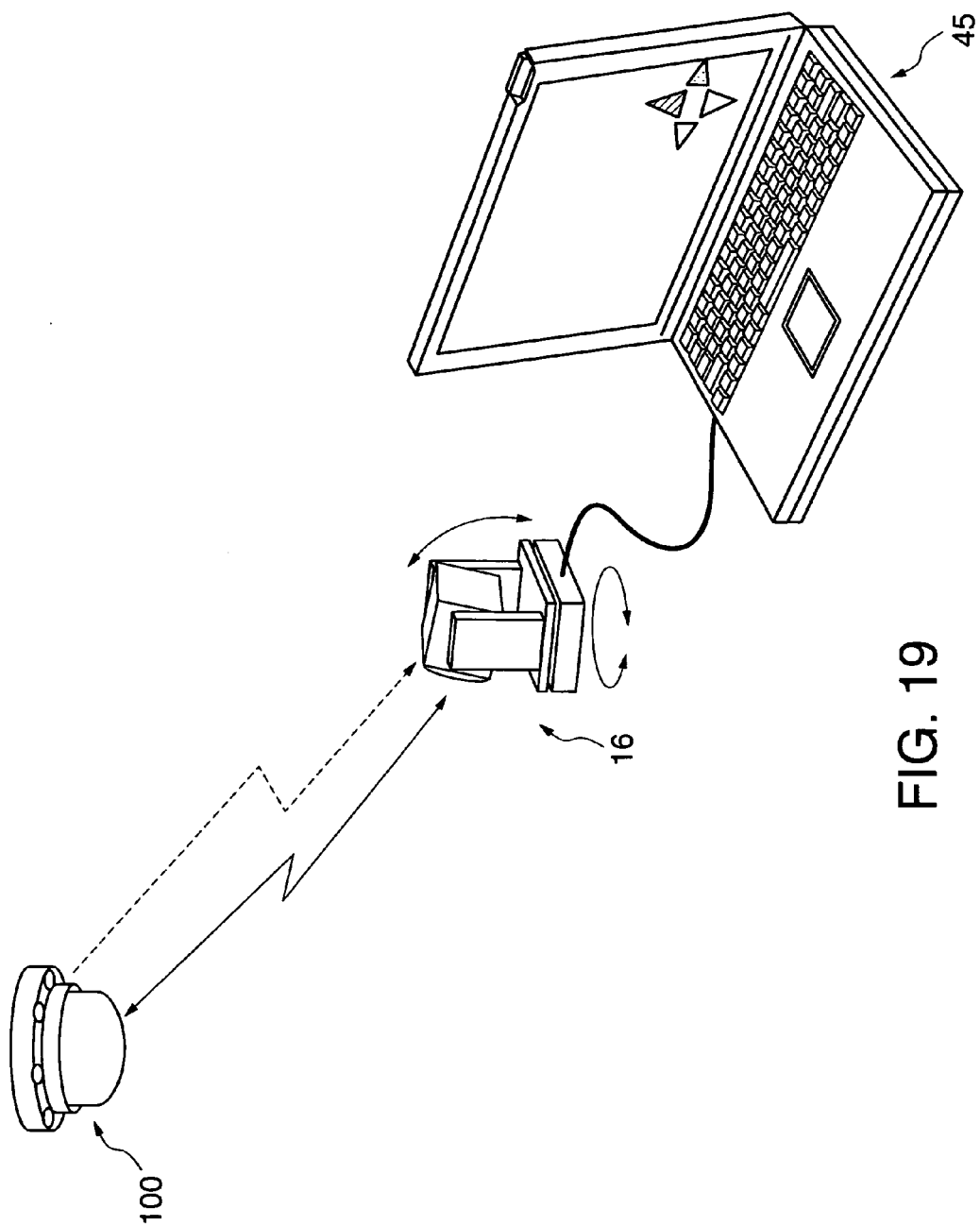
FIG. 19 illustrates a fourth embodiment of an optical-axis directional indicating apparatus according to the present invention.

Illustrated in FIG. 19 is a fourth embodiment applicable to LAN (local-area network) in which the optical transceiver 16 (FIG. 8) is connected to a personal computer 45.

Shown on the personal computer 45 are arrows like those disclosed in the former embodiments indicating optical-axis mismatch between a base unit 100 and the optical transceiver 16. Communication-available indications may also be made on the personal computer 45, like the modification to the first embodiment and the second embodiment.

A user can make manual optical-axis adjustments between the base unit 100 and the optical transceiver 16 while monitoring the optical-axis mismatch and/or communication-available indications on the computer screen.

Fifth Embodiment

Figure 20:
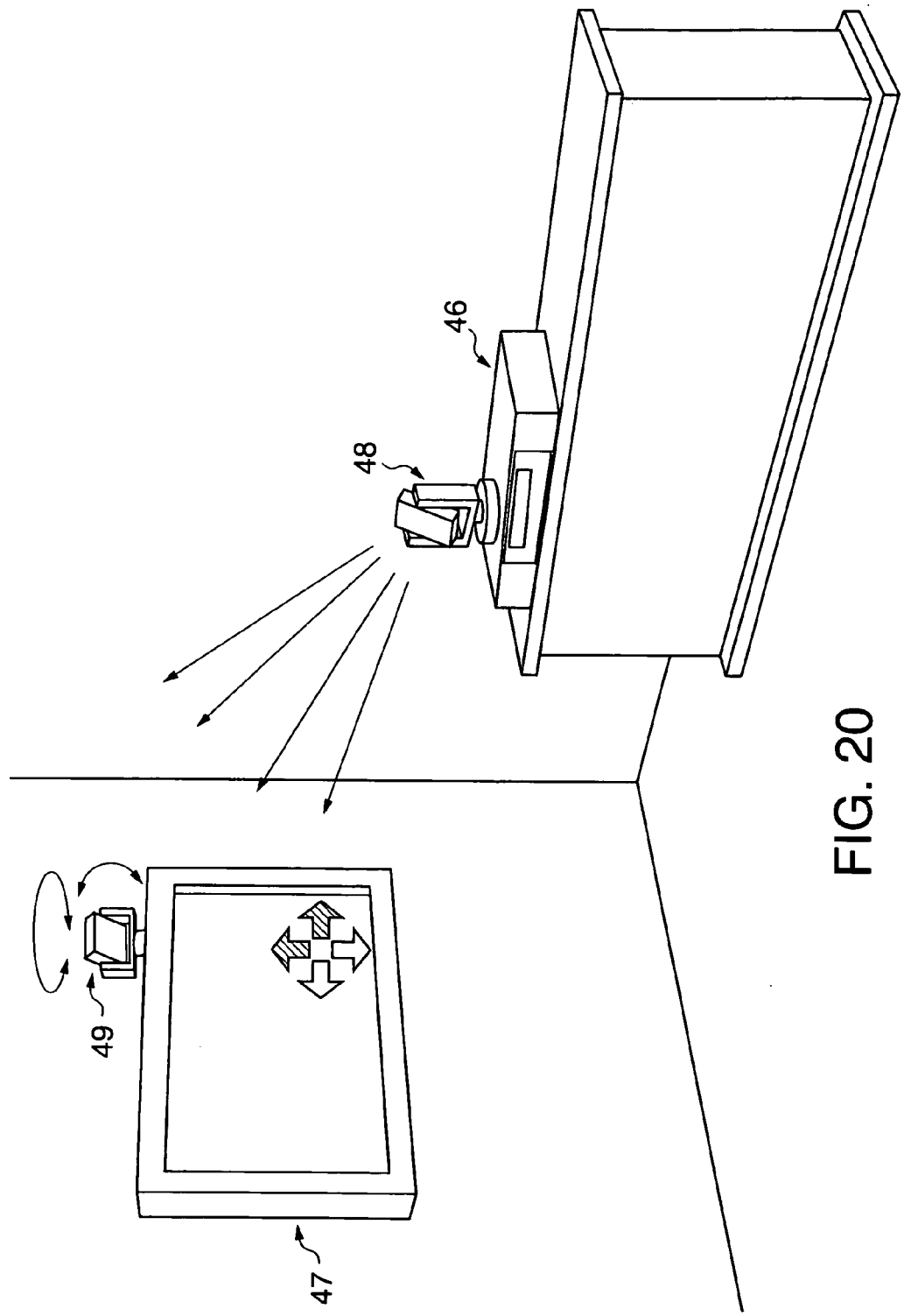
FIG. 20 illustrates a fifth embodiment of an optical-axis directional indicating apparatus according to the present invention.

Illustrated in FIG. 20 is a fifth embodiment applicable to optical wireless video/audio transmission in which a photoemitter 48 is connected to a video supply apparatus 46 such as a tuner, a VCR (video cassette recorder) or a VDR (video disk recorder) while a photoreceptor 49 is connected to a video display apparatus 47 such as a plasma or liquid crystal display.

Video and audio signals supplied by the video supply apparatus 46 are transmitted from the photoemitter 48 to the video display apparatus 47 via the photoreceptor 49. The photoreceptor 49 has the same function as the optical transceiver 16 (FIG. 8) disclosed in the former embodiments, except transmission capability.

Shown on the video display apparatus 47 are arrows like those disclosed in the former embodiments indicating optical-axis mismatch between the photoemitter 48 and the photoreceptor 49. Communication-available indications may also be made on the display apparatus 47, like the modification to the first embodiment and the second embodiment.

A user can make manual optical-axis adjustments between the photoemitter 48 and the photoreceptor 49 while monitoring the optical-axis mismath and/or communication-available indications on the video display apparatus 47.

Sixth Embodiment

The optical transceiver 16 and the photoreceptor 49 are manually rotated or tilted, in the former embodiments. However, they can be rotated or tilted by actuators like motors shown in FIG. 6.

Figure 21:
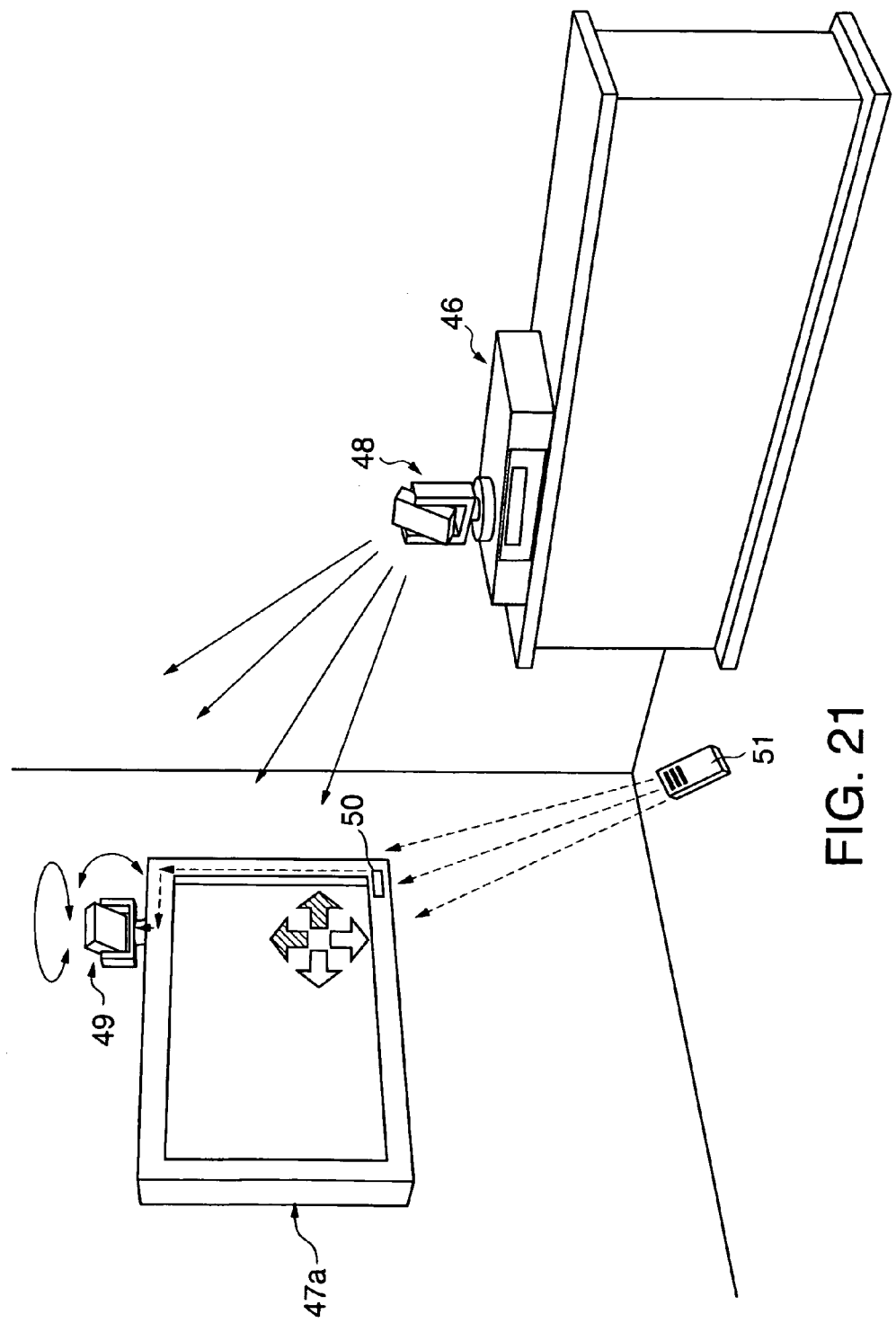
FIG. 21 illustrates a sixth embodiment of an optical-axis directional indicating apparatus according to the present invention.

In detail, as shown in FIG. 21, a video display apparatus 47a is equipped with a control-signal receiver 50 for receiving a remote control signal transmitted from a remote controller 51. The control-signal receiver 50 may be installed in the photoreceptor 49.

A user points the remote controller 51 towards the control-signal receiver 50 to send a directional command signal to automatically rotate or tilt the photoreceptor 49 for automatic optical-axis adjustments between the photoemitter 48 and the photoreceptor 49 while monitoring the optical-axis mismatch and/or communication-available indications on the video display apparatus 47a.

The remote controller 51 may also be used for other adjustments to the video display apparatus 47.

As disclosed in detail, the optical-axis directional indicating apparatus according to the present invention detects and displays optical-axis mismatch in the vertical and/or the horizontal direction. Therefore, a user can easily make optical-axis adjustments while monitoring indications of the optical-axis mismatch.

What is claimed is:

1. An optical-axis directional indicating apparatus for optical communication comprising:
   a base rotatable about a first axis that vertically passes through the base;
   a photoreceptor mounted on the base, the photoreceptor having a light-receiving surface that is rotatable about a second axis orthogonal to the first axis and a first optical receiving element, a second optical receiving element, a third optical receiving element and a fourth optical receiving element, to receive a transmitted light beam, the first and third elements being aligned on the surface in a first direction and located opposite each other in the first direction and the second and fourth elements being aligned on the surface in a second direction parallel to the second axis and orthogonal to the first direction and located opposite each other in the second direction with the first and third elements interposed between the second and fourth elements;
   a detector to detect levels of the light beam received at the optical receiving elements;
   a plurality of display elements arranged in the first and second directions so as to correspond to the optical receiving elements of the photoreceptor; and
   a switch circuit to selectively turn on or off the display elements in accordance with the levels of the light beam detected by the detector, to indicate whether or not an optical axis of the light beam is deviated in the first and/or the second direction on the light-receiving surface of the photoreceptor.

2. The optical-axis directional indicating apparatus according to claim 1 wherein the switch circuit includes a comparator to compare given reference values determined based on allowable ranges of deviation of the optical axis of the light beam in the first and second directions on the light-receiving surface of the photoreceptor and a first absolute value of a difference in the levels of the light beam received at the first and third optical receiving elements aligned in the first direction and also a second absolute value of a difference in the levels of the light beam received at the second and fourth optical receiving elements aligned in the second direction, the switch circuit selectively turn on or off the display elements in accordance with results of comparison, thus indicating that the deviation of the optical axis in the first and/or the second direction is within or out of allowable ranges.

3. The optical-axis directional indicating apparatus according to claim 2 further comprises a communication-available indicating display element that is turned on by the switch circuit to indicate that optical communication is available when the first and second absolute values are smaller than the reference values.

4. The optical-axis directional indicating apparatus according to claim 2 wherein each of the display elements includes a plurality of display segments arranged in the first or the second direction to be selectively turned on or off by the switch circuit in accordance with the results of comparison, thus indicating in stages that the deviation of the optical axis in the first or the second direction is within or out of the allowable range in the first or the second direction.

5. An optical wireless communications system comprising:
   a first optical wireless communications apparatus for transmitting a light beam; and
   a second optical wireless communications apparatus for receiving the light beam, the second optical wireless communications apparatus including:
   a base rotatable about a first axis that vertically passes through the base;
   a photoreceptor mounted on the base, the photoreceptor having a light-receiving surface that is rotatable about a second axis orthogonal to the first axis and a first optical receiving element, a second optical receiving element, a third optical receiving element and a fourth optical receiving element, to receive a transmitted light beam, the first and third elements being aligned on the surface in a first direction and located opposite each other in the first direction and the second and fourth elements being aligned on the surface in a second direction parallel to the second axis and orthogonal to the first direction and located opposite each other in the second direction with the first and third elements interposed between the second and fourth elements;
   a detector to detect levels of the light beam received at the optical receiving elements;
   a plurality of display elements arranged in the first and second directions so as to correspond to the optical receiving elements of the photoreceptor; and
   a switch circuit to selectively turn on or off the display elements in accordance with the levels of the light beam detected by the detector, to indicate whether or not an optical axis of the light beam is deviated in the first and/or the second direction on the light-receiving surface of the photoreceptor.

6. The optical wireless communications system according to claim 5 wherein the switch circuit includes a comparator to compare given reference values determined based on allowable ranges of deviation of the optical axis of the light beam in the first and second directions on the light-receiving surface of the photoreceptor and a first absolute value of a difference in the levels of the light beam received at the first and third optical receiving elements aligned in the first direction and also a second absolute value of a difference in the levels of the light beam received at the second and fourth optical receiving elements aligned in the second direction, the switch circuit selectively turn on or off the display elements in accordance with results of comparison, thus indicating that the deviation of the optical axis in the first and/or the second direction is within or out of allowable ranges.

7. The optical wireless communications system according to claim 6 wherein the second optical wireless communications apparatus includes a communication-available indicating display element that is turned on by the switch circuit to indicate that optical communication is available when the first and second absolute values are smaller than the reference values.

8. The optical wireless communications system according to claim 6 wherein each of the display elements includes a plurality of display segments arranged in the first or the second direction to be selectively turned on or off by the switch circuit in accordance with the results of comparison, thus indicating in stages that the deviation of the optical axis in the first or the second direction is within or out of the allowable range in the first or the second direction.

9. An optical wireless communications system comprising:
   a first optical wireless communications apparatus for transmitting a light beam; and a second optical wireless communications apparatus, connected to a monitor screen, for receiving the light beam, the second optical wireless communications apparatus including:
a base rotatable about a first axis that vertically passes through the base;
a photoreceptor mounted on the base, the photoreceptor having a light-receiving surface that is rotatable about a second axis orthogonal to the first axis and a first optical receiving element, a second optical receiving element, a third optical receiving element and a fourth optical receiving element, to receive a transmitted light beam, the first and third elements being aligned on the surface in a first direction and located opposite each other in the first direction and the second and fourth elements being aligned on the surface in a second direction parallel to the second axis orthogonal to the first direction and located opposite each other in the second direction with the first and third elements interposed between the second and fourth elements;
a detector to detect levels of the light beam received at the optical receiving elements; and
an on-screen generator to generate an on-screen signal in accordance with the levels of the light beam detected by the detector and sending the on-screen signal to the monitor screen to display a plurality of indications arranged in the first and second directions so as to correspond to the optical receiving elements of the photoreceptor, the indications being selectively turned on or off in accordance with the levels of the light beam detected by the detector, to indicate whether or not an optical axis of the light beam is deviated in the first and/or the second direction on the light-receiving surface of the photoreceptor.

10. An optical wireless communications system to be used for a video system having a video supply apparatus and a video display apparatus placed apart from each other comprising:
a first optical wireless communications apparatus, provided for the video supply apparatus, for transmitting a light beam carrying a video signal to the video display apparatus; and
a second optical wireless communications apparatus, provided for the video display apparatus, for receiving the light beam, the second optical wireless communications apparatus including:
a base rotatable about a first axis that vertically passes through the base;
a photoreceptor mounted on the base, the photoreceptor having a light-receiving surface that is rotatable about a second axis orthogonal to the first axis and a first optical receiving element, a second optical receiving element, a third optical receiving element and a fourth optical receiving element, to receive a transmitted light beam, the first and third elements being aligned on the surface in a first direction and located opposite each other in the first direction and the second and fourth elements being aligned on the surface in a second direction parallel to the second axis and orthogonal to the first direction and located opposite each other in the second direction with the first and third elements interposed between the second and fourth elements;
a detector to detect levels of the light beam received at the optical receiving elements; and
an on-screen generator to generate an on-screen signal in accordance with the levels of the light beam detected by the detector and sending the on screen signal to the video display apparatus to display a plurality of indications arranged in the first and second directions so as to correspond to the optical receiving elements of the photoreceptor, the indications being selectively turned on or off in accordance with the levels of the light beam detected by the detector, to indicate whether or not an optical axis of the light beam is deviated in the first and/or the second direction on the light-receiving surface of the photoreceptor.

11. The optical-axis directional indicating apparatus according to claim 1, wherein the base is provided with the display elements.

12. The optical wireless communications system according to claim 5, wherein the base is provided with the display elements.

* * * * *